H. W. OSTERHOUT.
BUMPER FOR LITTER CARRIERS.
APPLICATION FILED MAY 4, 1914.
1,171,801.
Patented Feb. 15, 1916.
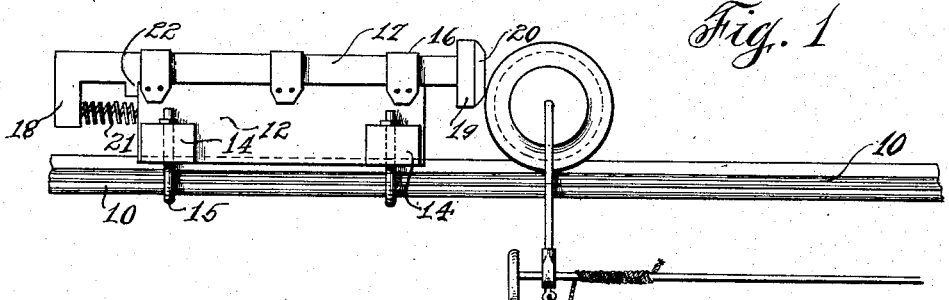
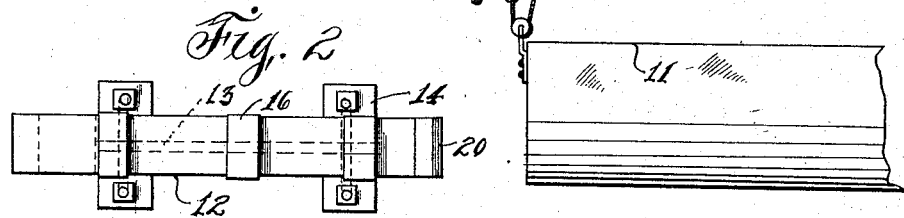
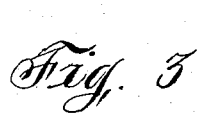
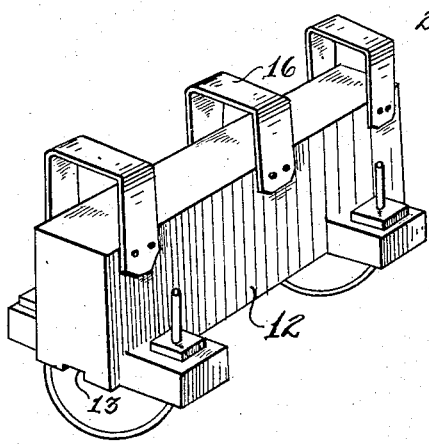
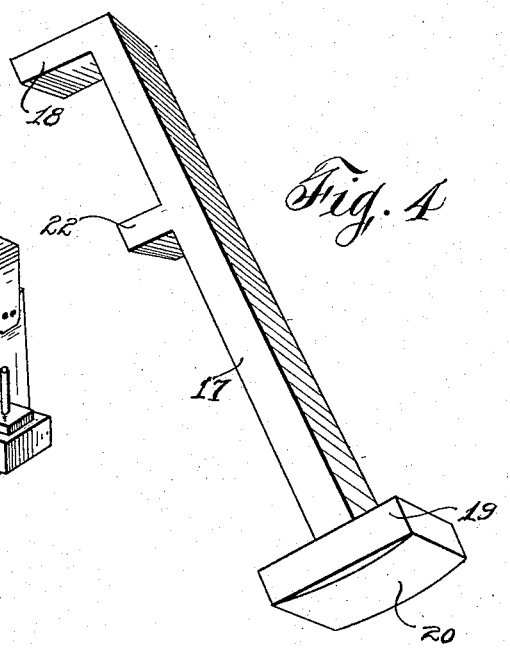

UNITED STATES PATENT OFFICE.

HERRICK W. OSTERHOUT, OF VALLEY FALLS, NEW YORK.

BUMPER FOR LITTER-CARRIERS.

1,171,801.  Specification of Letters Patent.  Patented Feb. 15, 1916.

Application filed May 4, 1914. Serial No. 836,231.

*To all whom it may concern:*

Be it known that I, HERRICK W. OSTERHOUT, a citizen of the United States, residing at Valley Falls, in the county of Renssalaer, State of New York, have invented certain new and useful Improvements in Bumpers for Litter-Carriers; and I do hereby declare the following to be a full, clear, and exact description of the invention, such as will enable others skilled in the art to which it appertains to make and use the same.

This invention relates to bumpers for litter carriers.

The object of the invention resides in the provision of a bumper of the type referred to which can be readily secured to any track or cable and which will efficiently absorb the momentum of a litter carrier so as to bring same to a stop without possible injury to the bumper or the carrier.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a litter carrier bumper constructed in accordance with the invention and showing same applied to a track; Fig. 2, a plan view of what is shown in Fig. 1; Fig. 3, a perspective view of the base block of the bumper, and Fig. 4, a perspective view of the movable elements of the bumper.

Referring to the drawings 10 indicates a litter carrier track and 11 a litter carrier mounted thereon in the usual and well known manner.

The improved bumper is shown as comprising a body portion 12 provided with a longitudinal groove 13 in its lower face. This body portion 12 is provided at each end with opposite lateral ears 14 and engaged through corresponding opposite ears 14 are U-shaped clamping members 15 whereby the body portion 12 may be securely attached to the track 10. Secured to and embracing the body portion 12 are U-shaped guide members 16 which extend across the upper side of the body portion and have their arm connecting portions disposed in spaced relation to the upper side of the body portion. Slidably mounted in the guide members 16 is a bar 17 one end of which terminates in a depending arm 18 and the other end in a head 19 provided on its outer end with a rubber cushion 20. The arm 18 is connected to the adjacent end of the body portion 12 by a spring 21 which normally holds the head 19 in spaced relation to the body portion 12. Movement of the head 19 away from the body portion 12 is limited by means of a stop 22 formed on the bar 17 and engageable with the end of the body portion to which the spring 21 is attached.

In the use of the device it will be apparent that the litter carrier 11 or more specifically the suspending wheels thereof will engage the cushion 20 and the momentum of the carrier will tension the spring 21 as a result of longitudinal movement of the bar 17. This operation will serve to absorb the momentum of the carrier and arrest the movement thereof. When this momentum is completely absorbed the spring 21 will operate to move the bar 17 to its normal position, such movement being limited by engagement of the stop 22 with the body portion 12.

What is claimed is:—

A device of the class described having means for attachment to a fixed track, guide members carried by a body portion and embracing one side edge thereof, a bar slidably mounted in said guide members for longitudinal movement and entirely supported upon the side edge of the body embraced by the guide members, a depending arm on one end of said bar, a spring connecting said arm and body portion and yieldingly holding the bar against movement in one direction, and a head on the other end of said bar provided with a yielding cushion on the outer end thereof.

In testimony whereof, I affix my signature, in the presence of two witnesses.

HERRICK W. OSTERHOUT.

Witnesses:
LESTER L. OSTERHOUT,
CHAS. S. CHASE.

Copies of this patent may be obtained for five cents each, by addressing the "Commissioner of Patents, Washington, D. C."